July 13, 1954  R. M. WILCOX  2,683,635
AIR BEARING

Filed Nov. 12, 1949  3 Sheets-Sheet 1

Inventor
Roy M. Wilcox
by Douglas S. Johnson
atty.

July 13, 1954  R. M. WILCOX  2,683,635
AIR BEARING

Filed Nov. 12, 1949  3 Sheets-Sheet 2

Inventor
Roy M. Wilcox
by Douglas S. Johnson
atty.

Patented July 13, 1954

2,683,635

UNITED STATES PATENT OFFICE 2,683,635

AIR BEARING

Roy M. Wilcox, Toronto, Ontario, Canada

Application November 12, 1949, Serial No. 126,757

20 Claims. (Cl. 308—9)

This invention relates to improvements in bearings in which the lubricating film between the bearing surfaces is a gas usually compressed air and hence hereinafter referred to as "air bearings."

The principal object of the invention is to provide an air bearing which will be free from vibration.

Another important object is to provide a bearing having a high degree of accuracy for accurately centering spindles and carriages eliminating any wedge effects present with conventional oil bearings where the oil wedge built up between moving parts displaces the moving part.

Another important object is to provide an air bearing having a high stiffness factor that is, high ratio of change of load to change in thickness of the lubricating film to provide a high loading capacity while maintaining accuracy.

A further object is to provide a bearing which will be self-cleaning and in which there will be no wear nor heating nor possibility of locking of the moving parts.

A still further object of the invention is to provide a bearing having sufficiently large passages to overcome the problem of passage blocking permitting adequate air feed through the bearing for gyro gimbal bearings and eliminating the need for air returns or air seals.

The principal feature of the invention resides in the concepts of an air bearing wherein the feed and distributing channels supplying the pressure air film between adjacent bearing surfaces are controlled in physical size in relation to the extent of the lubricating film below limits which cause vibration.

More particularly the invention resides in the provision of a gas bearing in which the bearing surfaces form a variable gas flow restriction variable with thickness of the lubricating gas film and the gas flow restriction provided ahead of the film, this latter restriction and any volume of gas between these restrictions being specifically limited to eliminate generation of sufficient vibration energy by film pressure hysteresis and turbulence to cause bearing vibration.

A further and very important feature consists in forming a distributing channel arrangement constituting part of the pressure film to provide increased compressed air distribution and desired film regulation leading to a high load capacity while at the same time limiting any air pockets or volumes of air in or connected without appreciable flow restriction to the high pressure area of the lubricating film below a volume which would cause vibration of the bearing.

Another feature of the invention consists in forming an air bearing to limit film thickness and film velocity below that Reynold's number at which turbulence occurs.

Another feature of the invention is the formation of a bearing surface that has variation in flow section due to change in load, concentrated toward the edge of the bearing for high load capacity and high stiffness factor.

Another feature of the invention consists in providing a bearing surface, at least a portion of which is porous.

Another feature of the invention is the provision of a multi-hole bearing with parallel surfaces having an expansion ratio, that is, ratio of flow section at air inlet to flow section at bearing edge which will enable the bearing to operate without vibration.

These and other objects and features will become apparent from the following description in reference to the accompanying drawings in which

Figure 11 is an underside plan view similar to

Figures 9 and 10 but showing a further modification of my invention wherein the bearing surface is formed with a groove in communication with the air supply orifices.

Bearings are manufactured in a multitude of geometric forms but their basic function is the same, namely, to locate or orient a moving body in spite of disturbing forces with a minimum of friction.

Lubricating with a gas instead of a liquid reduces the film fluid friction by some seven thousand times. This low friction allows a higher rate of sheer giving speed limited only by the bursting strength of the moving part or rotor and allowing a thinner lubricating film and enabling a much more accurate bearing.

Other disadvantages of oil bearings comprise the presence of oil wedges and discontinuous oil films, both of which may also be eliminated to all practical purposes by the use of a compressed gas film.

A number of different type air bearings have been proposed some of which rely for lubrication on an air wedge which is built up by the moving part drawing air into the bearing upon reaching very high speed. In such a bearing the parts are in direct contact at lower speeds until the air wedge is established.

The simplest and oldest type of proposed air bearing is a pocket of compressed air confined to one side of a revolving member to support it and its load against gravity. Such a bearing is not capable of accurate location and has the further serious disadvantage that it vibrates and is therefore unacceptable as a practical bearing.

The most efficient air bearing of which I am aware in the prior art is shown in United States Patent to Carter Number 2,086,896, July 13, 1937. This patent defines the centering of the journal by dividing the bearing into film pressure areas supplying each area through a fixed restriction so that air escaping from the loose side of the bearing lowers the film pressure in that section. This patent however calls for an "ample air cushion provided at the point of greatest load" defining a pocket in or connected to the pressure lubricating film.

All of the prior art bearings are subject to vibration which has rendered them unsuitable for practical bearing constructions.

I have discovered that the solution for eliminating vibration from air bearings is to limit the volume of air in or connected to the high pressure lubricating film and to limit the thickness of the lubricating film under load below certain values at which I have found vibration occurs.

I have also discovered that the passage size leading to the film must be limited to prevent vibration. The criterion for determining a passage size may be considered what I term the expansion ratio E, and this is equal to the ratio of the sectional area of flow of the passage or combined passage network which supplies pressure gas to the film and forms a restriction to limit gas flow to the film and to isolate the film from the pressure supply and the sectional area of flow under no-load conditions at the edge of the bearing or perimeter of the lubricating film defined by the perimeter of the bearing and the film thickness at no-load at the perimeter.

Where the restriction in the feed passage or combined passage network delivering the pressure gas to the film occurs at the entrance to the film and the sectional area of flow at this restriction is dependent on film thickness e. g., in parallel surface bearings with relatively large spaced holes, then the expansion ratio is simply the ratio of the combined perimeters of the feed passages to the perimeter of the lubricating film. Specifically, in parallel surface bearings, this ratio cannot exceed 1/11 and normally this ratio cannot be exceeded in contoured bearings although with the latter type bearing the type of load and the type of contour have some effect and this ratio 1/11 may then be reduced to a lower value and I have found in special instances this ratio may be as low as 1/6.

I have found that the error in concept in the prior art, which has prevented the formation of an efficient air bearing for general use, is the requirement in the prior art of a substantial volume of air in or in communication with the film to support the load. The prior art also has failed to disclose that self-centering is partly due to differences in pressure caused by differences in gas accelerations and resultant velocities.

Figure 1:
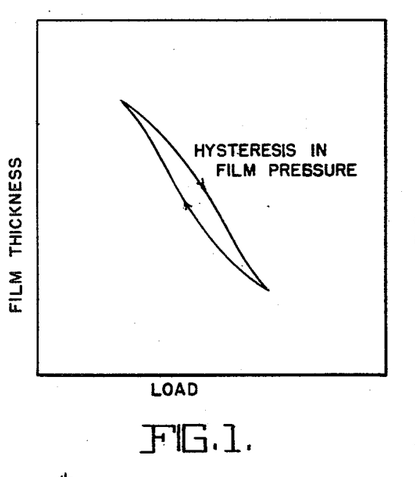
Figure 1 is a graph of film thickness against load showing the hysteresis in film pressure.

In an air bearing compressed air is forced between the bearing surfaces to support the film pressure. The film thickness is self-regulating and the bearing surfaces never touch. As the air or gas film is elastic this film and the load on the bearing behave as a spring supporting a mass, a system capable of oscillation. Energy is generated in the air film to sustain oscillation by pressure hysteresis and possibly by turbulence. This will be understood with reference to Figure 1 where the area within the hysteresis curve of film thickness plotted against load represents the vibration energy supplied by the air supply to the load.

This energy is the cause of the incapability of previous air bearings to operate without vibration under load variations.

I have discovered that the vibration tendency of the air film may be damped by fluid friction as well as mechanical friction to a point where vibration is eliminated. That is, a successful bearing may be built in which the volume of air in or connected without appreciable flow restriction with the film may be made sufficiently small to provide a fluid friction greater than the vibration energy generated in the film.

Another factor to be considered in eliminating vibration is the size of the feed passage or passages in relation to the extent of the film which they feed and here again the prior art has been silent while I have discovered that there is a definite limit in this relationship which needs to be retained in a practical air bearing design.

Another way of expressing the concepts of my invention is as follows considering that the separation of the bearing surfaces constitutes a variable gas flow restriction:

In addition to the inherently present variable gas flow restriction I must have a restriction in the passage formation delivering the compressed gas to the film sufficient to isolate the film from the pressure source and to avoid generation of vibration energy by film pressure hysteresis and turbulence, and as well I must have a limited compressed gas volume between these restrictions again to avoid generation of vibration energy by film pressure hysteresis and turbulence. That is, the generation of vibration energy must not be in excess of damping and consistent with the degree of stability required in the use of the bearing.

With the foregoing understanding it will be appreciated that hysteresis and turbulence will increase with an increase in the volume of air between the bearing surfaces. Fluid friction will decrease with an increase in film thickness, and therefore to avoid vibration the volume of air between the bearing surfaces must be less than a certain critical value.

This requirement is in direct contrast to the requirements of the prior art for an ample volume of air or air pockets to support the load. I have found on the contrary that an air bearing may be successfully designed to limit the volume of air in or connected to the lubricating film below that at which the bearing vibrates and at the same time provide a high load capacity. This may be done by arranging the airflow restriction in the bearing under maximum load to be appreciably greater at the edge than the restriction where the air enters the lubricating film so that the restriction at the edge is in control of the flow through the bearing.

As previously explained, vibration of an air bearing occurs when too large a volume of air is in or connected to the air presure film. There are actually two sources of vibration in air bearings. First, air storage and second, turbulence. The first, air storage, is the more important and all critical and causes vibration at all loads and pressures. The second, that is, turbulence, occurs when the flow is large due to light load and high supply pressure. Air storage must be limited so that the volume of air in or connected to the high pressure area of the lubricating film is exceedingly small.

Also the expansion ratio E must be limited as explained above.

For the central feed disclosed in Figures 4 and 5 and Figures 12 and 14 and the peripheral grooved arrangement of Figures 9, 11 and 17, this volume criterion is set forth in the table under the heading "Volume Factor" hereinafter explained. What actually this volume factor means is that if the permissible volume of the deviation of the bearing surfaces from parallelism were spread evenly over one bearing surface it would have to be in all cases, to prevent vibration, less than two-thousandths of an inch thick and in practice is one-fortieth of this value.

Figure 7:
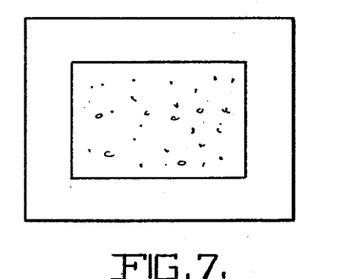
Figure 7 is an underside plan view of a bearing surface formed in part by a porous material in accordance with one form of my invention.
Figure 8:
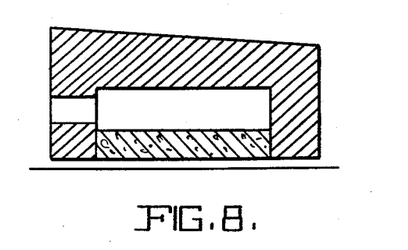
Figure 8 is a vertical sectional view through the bearing of Figure 7.
Figure 10:
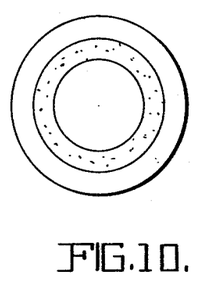
Figure 10 is an underside plan view similar to Figure 9 but illustrating another modification of my invention wherein an annular porous ring through which air can be directed forms part of the bearing surfaces.
Figure 15:
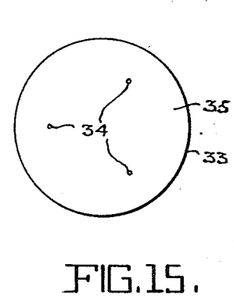
Figure 15 is the underside plan view of a multi-hole parallel surface type of bearing constructed in accordance with my invention free of vibration.

In the multi-hole bearings with parallel surfaces, such as Figure 15 and to some extent Figures 7, 8 and 10, which are multi-hole bearings in the extreme, the problem of air volumes causing vibration does not appear to be as vital as in contoured bearings, although the total perimeter of the feed passages must be kept within limits with respect to the extent of film as before. However even in this type of bearing the volume of air in the holes which is in contact with a small area of the opposite bearing surface may cause vibration unless limited. In this type of bearing the size of the flow section or orifice at the entrance to the film of the feed passages to the size of the flow section at the edge of the bearing, that is, the expansion ratio may be considered and this ratio must be kept within limits.

As stated I have found that an expansion ratio of approximately 11 to 1 is required to limit the volume in the film to eliminate vibration.

Reference has been made to restriction at the point of entry of the air to the film or ahead of the film and it is to be understood that this restriction in reference to air bearings means the artifice by means of which the flow of compressed air from the source is restricted from direct communication with the lubricating pressure film. This restriction may take many different forms from simply the edge of the feed hole at its entrance to the film, Figures 15 and 16, to the contoured forms of Figures 4 and 5 or may constitute a separate or special flow regulating valve or a series of fine passages, such as a number of small holes leading to the film, which in the extreme constitutes a porous surface, or narrow slots or other feed passage means constituting a gas flow restriction ahead of the film.

The requirement of a restriction is essential to centre or locate the moving bearing so that air pressure in the film as the bearing surfaces separate will be reduced to reduce the separating pressure and provide a self-regulating effect for locating, orienting or centering the one bearing surface in respect to the other.

The restriction has upper and lower limits as follows. It must permit sufficient flow to the film to provide pressure in the film yet it must be sufficiently restricting to isolate the air supply from the film to prevent vibration. To prevent turbulence the restriction should be well rounded, and spread over a large enough area to limit velocity and thin enough to limit "hydraulic radius" which together determine the Reynold's number.

For optimum bearing stiffness the restriction should be such that the film thickness or flow section at the restriction remain substantially constant under loading while varying at the edge of the bearing.

Figure 3:
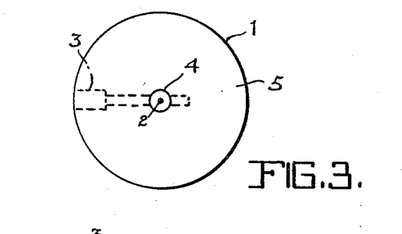
Figure 3 is a plan view of one type of bearing constructed in accordance with my invention and having the air flow contour of Figure 2.
Figure 4:
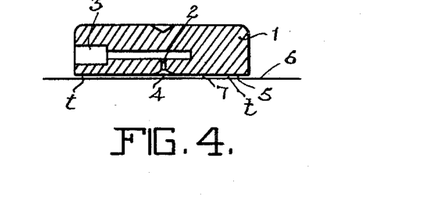
Figure 4 is a vertical mid-sectional view of the bearing formation of Figure 3.
Figure 12:
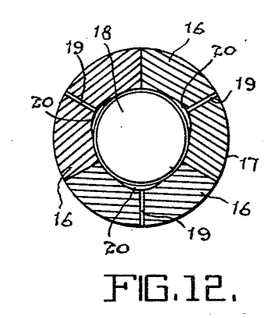
Figure 12 is a vertical sectional view of a radial bearing constructed in accordance with my invention and employing a contoured surface having contours of the type disclosed in Figures 2 to 4 respectively.
Figure 14:
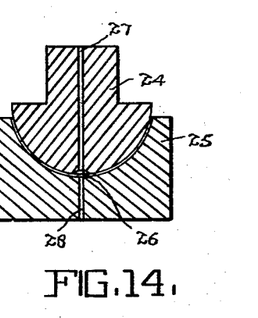
Figure 14 is a vertical sectional view taken through a spherical bearing constructed in accordance with the concepts of my invention.

The above concepts of my invention will be more readily understood with reference to the illustrations of the drawings, and referring particularly to Figures 3 and 4, a central feed contoured bearing which has been found to operate without vibration is disclosed. This bearing in its illustrated form is a plane or thrust bearing comprising a block 1 having a central orifice 2 leading from a pressure air supply passage 3 and terminating in the contoured restriction 4 in the bearing face 5, defining with the opposing bearing surface 6 a lubricating pressure air film 7 therebetween. Such a bearing is suitable for flat or V-type machine ways or spindles or other types of radial bearings, such as shown in Figures 12 and 14.

Figure 2:
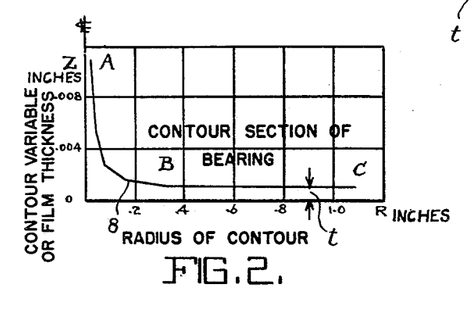
Figure 2 is a graphic illustration of the contour section of the bearing of Figures 3 and 4.

An enlarged diagrammatic illustration of the shape of this contour 8 is shown in Figure 2 and is divided into two sections, a constant area section A—B forming the restriction and a plane section B—C. The revolution of the curve A—B—C about the O—Z axis will give the bearing surface contour of Figure 4. The actual curve A—B is shown discontinuous for machining but it holds substantially correct to a constant flow section area outwardly from the centre of the central orifice of hole 2 to B. From B—C, as the radius R is increasing, the section area of flow is increasing.

In this illustration the inner contour A—B is defined by Z (that is, contour variable or film thickness at any radius) equals $$\frac{C'}{R}$$

where C' is a constant. If C' is increased so that this same contour may be continuous out through C, too large a pocket is provided between the bearing surfaces 5 and 6 and in communication with the pressure film 7 and vibration occurs.

A modification of the contour A—C to provide maximum load capacity is to form the contour A—C so that $$Z = \frac{C''}{\sqrt{R}}$$

Such a contour decreases flow resistance through the bearing to a minimum without increasing volume, thereby concentrating the pressure drop toward the outer edge of the block 1.

Figure 5:
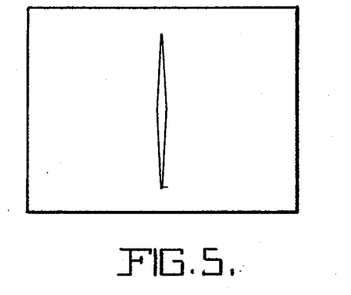
Figure 5 is an underside plan view of an alternative form of bearing in accordance with my invention of the central orifice type similar to Figures 3 and 4 but having the flow contour in the form of grooves.
Figure 6:
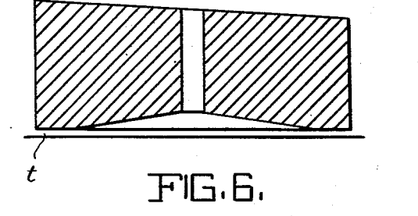
Figure 6 is a vertical sectional view taken through the bearing of Figure 5.

In Figure 5 the contour of Figure 3 is replaced by the grooves 9 which provide limited air storage in distributing air outwardly from the central orifice or hole 2.

Since in a pressure gas bearing specific volume greatly increases as pressure decreases and a considerable portion of the decrease is in the parallel portion of the film space, the flow section of the distributing means need not be nearly as large or extensive as the flow section at the perimeter of the bearing in order to avoid restriction under full load.

Figure 9:
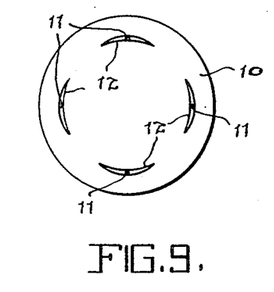
Figure 9 is the underside plan view of one form of multi-hole bearing constructed in accordance with another form of my invention employing peripheral orifices terminating in formed grooves in the bearing surface.

Figure 9 shows a contoured bearing 10 having equally spaced holes 11 adjacent the periphery thereof opening into the shaped distributing grooves 12. These grooves 12 are parallel the film perimeter and are formed to limit the volume of air in communication with the air film to a permissible value below that volume at which the bearing will vibrate in accordance with the table.

Figure 11:
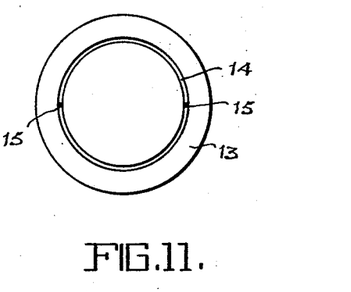

Figure 11 shows the bearing suface 13 of another modification of my invention formed with a peripheral groove 14 in communication with the pressure air supply holes 15. Again, the volume of air in the groove, which will be in communication with the pressure air flow of a bearing employing a bearing suface such as 13, is limited to a permissible value at which the bearing will be free from vibration again in accordance with the table.

This bearing of Figure 11 clearly presents the fundamental concept of my invention viz. that I must have in addition to the variable gas flow restriction presented by the variable space between the surfaces, a gas flow restriction (orifices 15) ahead of the film to isolate the film from the supply source, and a limited gas volume (in the groove 14) between these restrictions to prevent vibration.

In connection with Figure 11, it will be noted that if this type of grooved bearing surface 13 is developed as a segment in a radial bearing, the groove 14 in each bearing segment will be confined to that segment. This is clearly distinctive from the prior art which has used a grooved passage in a bearing surface in a radial bearing, but according to the prior art the groove extended peripherally around the bearing so that the pressure at any side of the bearing was exactly the same as the pressure at the opposite side, affording no load capacity as the loading depends on the differential in pressure available on opposite sides of the bearing, as will be explained in reference to the radial bearings in Figures 12 to 14, which are simply developments of the bearing types of Figures 4 and 10.

In regard to the limitation on the air volume connected to the film to prevent vibration i. e. the air volume between the variable flow restriction constituted by the film and the restriction isolating the film from the supply source, I am able to define a relation between the bearing contour, that is, the extent to which the bearing surfaces are hollowed or grooved in the case of a plane bearing, and the area of the bearing, that is, the area of the lubricating film between the bearing surfaces. This relation I term a volume factor $$C = \frac{V}{A_b}$$

V representing the extent or volume to which the bearing surfaces are hollowed or grooved or contoured, but not including the volume of the feed passage or passages to the contour, and $A_b$ the area of the bearing.

The volume factors for different types of bearings are given below in the table:

| Bearing Type | Free From Vibration | Shows Vibrating Tendency | Vibrates |
| --- | --- | --- | --- |
| Central Hole, Figs. 4, 5, 12, 14. | $C = 2.6 \times 10^{-5}$ in | $C = 9.7 \times 10^{-5}$ in | $C = 3.8 \times 10^{-4}$ in |
| Peripheral Groove, Figure 11. | $C = 3.6 \times 10^{-5}$ in | $C = 1.3 \times 10^{-4}$ in | $C = 7.8 \times 10^{-4}$ in |
| Radial Bearing Periph. groove. | $C = 6.8 \times 10^{-5}$ in | $C = 3.0 \times 10^{-4}$ in | $C = 1.1 \times 10^{-3}$ in |

Note.—C is calculated on the volume or extent of the contour in the bearing surface.

Pressure and film thickness do to some extent affect the volume factor but their effect is small. Also where external damping is present the volume factor may be exceeded without vibration.

In geometric forms of bearings where the film is not flat such as radial types, the volume V may be defined as that due to the deviation of the bearing surfaces away from parallelism only. In all types the volume V does not include that volume due to bearing clearance $t$.

From the table it will be seen that in nearly every design the maximum volume factor for freedom from vibration is of the order of one ten thousandth inch, which means that if the permissible volume were spread evenly over the bearing surface it would be only one ten thousandth of an inch thick. While of course this value will vary with different contour designs, it is believed that in all cases the permissible volume would be less than two thousandth of an inch thick spread over the bearing surface. Any higher value of distributed permissible volume would cause vibration and it is here that the prior art has failed to appreciate the cause and solution of vibration in air bearings by making their bearings to incorporate pockets or air cushions which exceed the permissible volume factor. It is to be noted that where I speak of a contour this contour is actually exceedingly small only of the order of several thousandths of an inch at most below the bearing surface at its deepest point.

The problem of obtaining load capacity with an air bearing is important. Considering the single orifice type of bearing, the load equals the integral from zero to R of PdA, where zero represents the centre of the hole and R the edge of the bearing. Reference to Figure 4 will make the understanding of this integral more apparent. The integral is difficult to compute because the pressure also varies with R from the centre to the edge.

However it will be obvious that, if the pressure drop is concentrated toward the edge of the bearing, the film pressure will be high over a larger area and the value of the integral will be greater.

A bearing constructed in accordance with Figure 4 provides a good load capacity, for as the bearing surfaces 5 and 9 approach, the change in film thickness adjacent the edge of the block 1 will be a much greater proportion of the total thickness at that point, than is the case under the contour 8.

Thus as the load builds up bringing the bearing surfaces together, the restriction to the air flow is increasing most rapidly at the edge of the bearing so that at full load when the bearing surfaces are almost touching the pressure drop is concentrated toward the edge of the bearing and the integral representing load capacity will be high.

The bearing of Figure 4 may be considered in another way as an analogous electrical circuit comprising the fixed resistance R' corresponding to the resistance or restriction imposed at the entrance to the contour 8 and the series resistance $R^2$ imposed by the edges of the bearing and variable with varying surface separation. This analogous electrical circuit is illustrated in Figure 19 and is not only applicable to the bearings, in accordance with Figure 4, but is applicable to all bearings having a fixed $R_1$, such as the bearings of Figures 3 to 11.

Figures 18, 19:
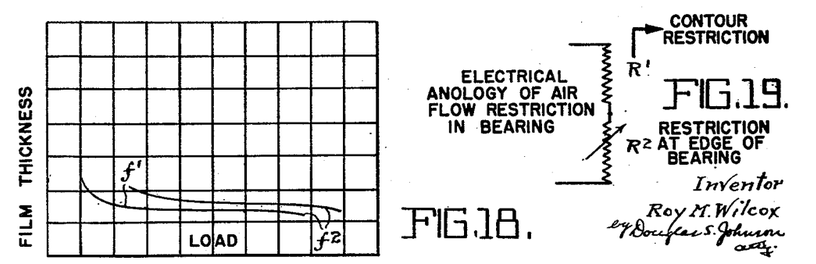
Figure 18 is a graph illustrating the relation between film thickness and load for different distributing contours.
Figure 19 is a schematic diagram of an analogous electrical circuit to the series circuit comprising the relatively fixed restriction or orifice at the point of distribution of air to the film in a contoured bearing and the variable restriction or orifice at the edge of the bearing.

The ability of a bearing to accept load must be also considered with its ability to locate and these two considerations depend on what I term flow regulation which can be understood from Figure 19 in reference to bearings such as Figures 4, 9 and 11 in which the inlet flow section is essentially fixed and independent of changes in film thickness.

To locate, the value R' at no load must be greater than the value $R^2$, but at load, $R^2$ must be greater than R' to have loading capacity.

The bearings of all types may have a fixed restriction R' upstream from the film or contour or groove to increase bearing stiffness by having a fixed orifice upstream (e. g. orifice 2 of bearing of Figure 4) small enough so that at all normal loads the pressure on the film side of the orifice is less than .53 of the pressure on the supply side of the orifice. As is well understood in the mechanics of pressure air flow when an orifice is such as to limit the pressure on its outlet side to less than .53 of the pressure on its high pressure side then mass flow through the orifice from the high to low pressure sides will be constant independent of the low pressure variation on the low pressure side.

Therefore by making the fixed upstream orifice small enough to limit the pressure ratio between supply and film to less than the .53 specified the orifice provides a fixed flow independent of variations of pressure in the film.

This explanation of flow regulation is essentially analogous to the previously described requirements for the restriction requirement. In effect it means that in a single orifice type of bearing of the types having the contour at the mouth of the hole constituting a gas flow restriction ahead of the film, this contour must be such that a restriction is provided at this point under no load and that the film thickness at the entrance to the film undergoes no appreciable change during loading while the film thickness at the edge of the bearing varies appreciably. Alternatively of course the gas flow restriction could be upstream of the contour.

Another factor that must be considered in bearing design is the stiffness factor $$S=\frac{dl}{dt}$$

where $dl$ represents the increment load change and $dt$ represents the increment film thickness change.

For an accurate bearing it is required that the change in film thickness for increments in load change be small. Also in bearing design the contour must provide the air flow which will give the desired thinness of the film under the normal loading. This consideration of film thickness and stiffness will be better understood with reference to Figure 18 where for different contours, i. e. values of relatively fixed resistances R' (Fig. 19) the film thickness is plotted as ordinate and load as abscissa.

The useful part of these curves for most purposes is the flat portion represented by the sections $f^1$ to $f^2$. The upward curve represents the case where the central orifice 2 has one diameter giving one value of R', and the lower curve is for the case where the central orifice has a smaller diameter giving a lesser value of R'.

The different curves show the different film thicknesses obtained in accordance with their ordinate readings and the flatness of the curves illustrates the stiffness of the bearings for accuracy under loading.

In addition to the small volume concept of my invention, I have stated that turbulence is also a source of vibration found at light loads and high pressures, that is large flow. Laminar flow becomes turbulent between Reynold's Numbers of 1100 and 20,000 or more. The higher value is approached as walls become smooth, the channel entrance is rounded off and the air in the supply reservoir has been brought to rest.

The extension of the principles of any of the plane bearings in Figures 3 to 11, 15 and 16 may be made to any geometric form, cylindrical, conical or spherical.

The cylindrical bearing of Figure 12 may be considered as made up of a number of segments 16 in the outer bearing ring 17 within which the shaft 18 revolves. Each of these segments is provided with a single orifice supply passage 19 terminating at its inner end in the contour 20 of the nature of the contour 8 of the bearing of Figures 2 to 4.

The illustrated bearing Figure 12 shows three different segments with the contours 20 spaced 120° apart. The number of segments of course may be increased as desired.

The load capacity of the bearing depends upon the differential pressure that can be provided on opposite sides of the shaft to centralize it and this differential pressure depends upon the shape of the contour, size and area of the bearing and the choice of the gas flow restriction ahead of the film in accordance with the various factors previously considered.

Figure 13:
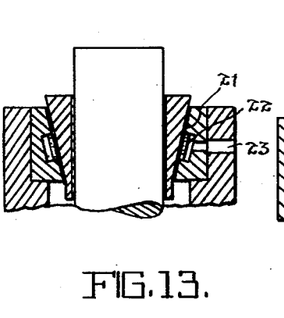
Figure 13 is a vertical mid-sectional view taken through a conical bearing constructed in accordance with my invention.

Figure 13 shows a conical form of bearing in which the bearing surface 21 is formed with a circumferential central section of porous material 22, such as sintered metal, in communication with an air pressure supply through the feed passage 23.

This circumferential strip of porous material 22 is not to be confused with prior bearing constructions. Using a circumferential groove, for the porous material provides a restriction to the air flow and enables a differential pressure to be established on opposite sides of the bearing, a fact not possible with prior art circumferential groove constructions.

In effect this porous section 22 is analogous to a multitude of individual feed orifices.

Figure 14 discloses a spherical bearing in which the rotor 24 is rotatably supported within the cap 25. This bearing is of the type of the Carter patent referred to above.

According to the prior art such a spherical bearing may have the radius of the rotor portion 24 similar to the radius of the cup recess 25, or where further air is required these radii may be different so that an air cushion is formed between the rotor and cup.

I have found that in the spherical bearing where the radii of the cup and rotor are concentric sufficient air cannot escape from the feed orifice to support and maintain a film of lubricating air in the bearing. Where the rotor and cup centres are displaced to permit sufficient air to escape from the feed orifice to maintain the film then the volume factor at which the bearing tends to vibrate is greatly exceeded.

It is suggested in the prior art that the number of feed holes be increased to maintain the film. At each hole flow is restricted by the corner of the hole and the opposite bearing surface. Since the bearing must be displaced under loading, this in effect provides a variable orifice or air flow section at the entrance of the feed hole to the film instead of the fixed hole effect obtained with a contour such as I have indicated in Figures 2 and 4 and applied to my rotor as at 26.

Where the number of holes are simply increased and the variable flow section occurs at the entrance of these holes to the film, both stiffness and load capacity are poor, as explained above.

In respect to all of the bearing types disclosed employing individual passage or passages leading to the film in addition to the problem of obtaining distribution of the pressure air to the film without exceeding the volume limits explained above, the actual feed means must also be controlled to limit the flow section of the feed passage or passages leading to the film so that the expansion ratio E does not exceed approximately 1/11.

In the bearing of Figure 14 the feed orifice 27, which terminates in the contour 26, is in communication with the distribution passage 28 extending through the cup 25 so that a further bearing may be supplied with pressure air. Such an arrangement is highly desirable, for example in supplying compressed air to the bearings of a gyro gimbal ring. This distribution passage 28 is exceedingly small and does not increase the volume of air in and connected to the film beyond the permissible volume factor.

Figure 17:
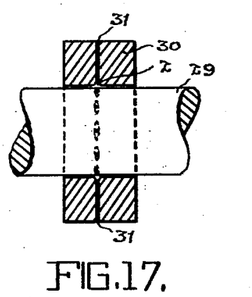
Figure 17 is a longitudinal mid-vertical sectional view through a further modified radial bearing.

Figure 17 illustrates another form of cylindrical bearing in which the shaft 29 is journalled within the ring 30 which may be considered as made up of segments, each having a feed orifice 31 therethrough, terminating in a formed distribution groove 2 of a size to limit the air within the groove to a volume below the maximum permissible volume factor.

Figure 16:
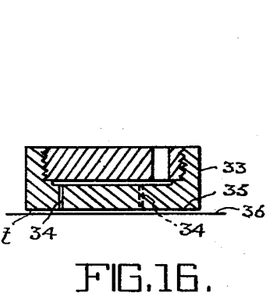
Figure 16 is a vertical mid-sectional view of the bearing of Figure 15.

Figures 15 and 16 illustrate a multi-hole type bearing with parallel surfaces. This bearing illustrated comprises a cup 33 having formed in the bottom thereof three equally spaced feed orifices 34 which lead to the bottom bearing surface 35 which is parallel with the opposing bearing surface 36. At each hole or orifice 34 the flow is restricted by the corner of this hole and the opposing surface 36. To permit enough air to be supplied to maintain a continuous pressure film a number of these holes are required, three shown in this particular bearing, so that their restrictions are in parallel and the overall restriction to the air flow is reduced.

With these multi-hole bearings with parallel surfaces both the size and number of the holes is limited by vibration. The result is that this type of bearing is actually inferior to the contour type in that stiffness is poor because flow is allowed to vary with the thickness of the film, since there is no restriction ahead of the entrance to the film. The provision of the several small holes instead of the one large hole is therefore to provide distribution without increasing the total flow section of the restriction ahead of the film—here at the entrance to the film. While the concept of small volume is adhered to with this type of multi-hole bearing to prevent vibration since there are no air pockets or volumes in the film, these bearings will vibrate unless constructed within specific limits. The criterion for determining the vibration limit is different from the volume factor in connection with the contoured bearings and depends upon the ratio of $A_f$ at the entrance to the film over $A_f$ at the perimeter, that is, the expansion ratio where $A_f$ represents the section area of flow.

In the large hole type of multi-hole bearing this expansion ratio is of the order of 1 to 11 and it remains fixed under loading, since $A_f$ or area of flow at both the entrance to the film and the perimeter changes with film thickness. Thus the film pressure cannot build up appreciably as the bearing surfaces come together so this type of bearing lacks the load capacity.

With the multi-hole bearing requiring fine holes the air filtering must be such as to reduce any particles in the pressure air flow to a size that will not block the hole. The filtering of course does not need to be so carefully controlled with the larger single feed type or bearing.

Figure 21:
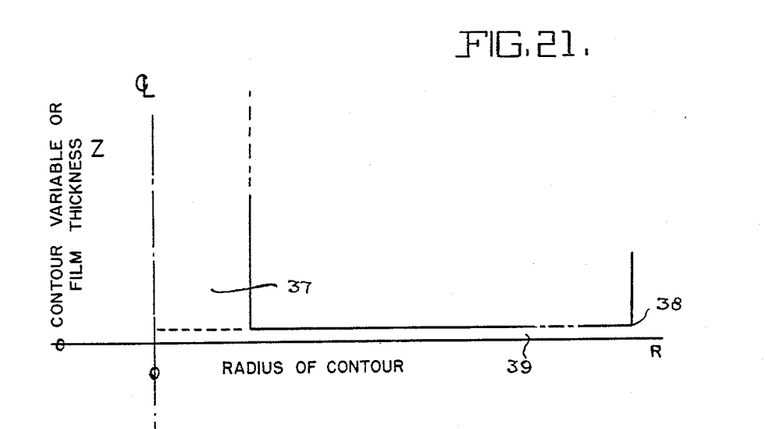
Figure 21 is a diagrammatic view of a central feed parallel type bearing of the same dimensions as the bearing of Figure 20 but having parallel surfaces and illustrating the maximum size of feed passage corresponding to the maximum size of passage permissible with the contoured bearing.

An expansion ratio of 1/11 has been determined for large hole parallel surface bearings. Referring to Figure 21 a central orifice parallel bearing is illustrated with the feed passages 37 increased to its maximum diameter while preventing the bearing from vibrating.

The expansion ratio as defined above is 1/11 and since the film thickness is equal to the entrance of the feed passage to the film and the edge or perimeter of the bearing, this ratio means that the ratio of the diameter, or radii or perimeter of the passage 37 to the diameter, or radii, or perimeter of the bearing edge 38 that is to where the lubricating film 36 extends, must also be 1/11. This places a definite limitation on the perimeter or combined perimeter of the feed passage means with respect to the film perimeter to prevent vibration.

Figure 20:
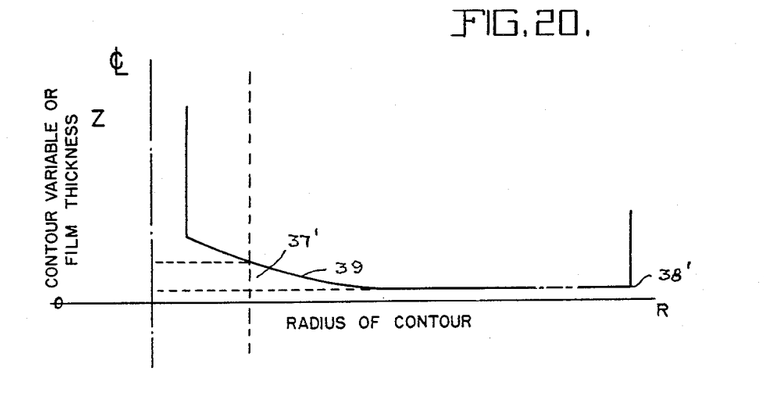
Figure 20 is a diagrammatic view of a central feed contoured bearing illustrating the normal maximum permissible size of feed passage which will eliminate vibration.

Figure 20 shows the same bearing as Figure 21 with the exception that the bottom corner of the feed passage 37' is cut to define the contour 39 which is shaped to provide a permissible volume factor so that its shape will not provide sufficient air storage for vibration. The limits on the size of this feed passage 37' shown in dotted line are identical with the limit on the size of the passage 37. With the contoured bearing of Figure 20 the expansion ratio of 1/11 may be exceeded since the thickness of the film at the edge of the feed passage is greater than at the bearing edge 38' a feed passage flow section forming a restriction may be upstream from the contour. The ratio P of the perimeter of the feed passage to the perimeter of the bearing is still maintained at 1/11 for preventing vibration i. e. the expansion ratio of the gas flow restriction constituted by the flow passage is still maintained at 1/11. Thus the effective size of the feed passage means relative the extent of the lubricating film must be carefully controlled.

With the porous-surface type of bearing disclosed in Figures 8, 10 and 13 a better load capacity is obtained than the multi-hole bearing although these porous bearings are in effect a multi-hole bearing carried to an infinite degree. The difference however lies in the fact that with the porous bearing the air restriction actually occurs ahead of the point of entry of the air to the film so that the restriction is not simply variable with the thickness of the film as in the case of the multi-hole bearing, and thus the bearing can be more heavily loaded and will have a better stiffness.

While the multi-hole bearings having relatively large holes and parallel surfaces are fundamentally somewhat inferior to the contoured type of bearing, nevertheless they may serve in many instances as highly desirable and efficient bearing constructions and by limiting the expansion ratio, vibration is eliminated.

An important consideration of the present bearing construction is that they require a low consumption of air, an important economical advantage and yet the actual air velocity at the edge of the bearing will, under all circumstances, be sufficient to blow off dust and foreign matter accumulating around the bearing, so that the bearing will be self-cleaning.

The contours in the bearing surfaces formed to distribute the compressed air to the lubricating film are not restricted to either the fixed surface or the moving surface. While either of these surfaces alone may be shaped to provide the desired contour within limits as set forth above, the two surfaces can be shaped so that the contour is divided between them provided the extent of such divided contour does not exceed the permissible limits.

It will be understood that any of the various types of bearings disclosed can be utilized in any geometrical bearing form and modifications including any combination of feeding air to the films and distributing this air to the film may be made from the example type of bearings disclosed without departing from the scope of my invention.

I am concerned solely with compressed air or gas as the means of lubrication and may incorporate a small quantity of oil or the like with the air to protect the bearing surfaces against rust and also against failure of the air supply, and therefore inclusion of such oil comes within the terms of meaning of air bearing.

What I claim as my invention is:

1. A gas bearing comprising a pair of relatively movable surfaces separated by a lubricating film of compressed gas, a source of compressed gas, and feed passage means in communication with said source and feeding said film to distribute said gas throughout said film, said surfaces being formed whereby the total extent of contour depression therein is less than that contour extent providing sufficient gas storage for vibration and does not afford a volume factor exceeding $2 \times 10^{-3}$ inches, and said feed passage means being formed to limit the total perimeter thereof below that total perimeter at which vibration occurs and not to exceed 1/11 of the perimeter of said film.

2. An air bearing comprising a pair of relatively movable surfaces, a hollow formation in at least one of said surfaces, air passage means leading to said hollow formation and in communication with a pressure air source to deliver pressure air between said surfaces as a lubricating pressure air film and forming a substantially constant air flow restriction, the spacing of said surfaces forming a gas flow restriction variable under bearing loading, the extent of said hollow formation being such as to limit its air storage volume below that volume of air which in unrestricted communication with said pressure film vibrates said relatively movable surfaces and not to exceed a volume factor of $2 \times 10^{-3}$.

3. A central feed type vibrationless gas bearing comprising a pair of relatively movable bearing surfaces, a contour formed in one of said bearing surfaces, and a restricted feed passage forming a substantially constant air flow restriction leading from a compressed gas source centrally to said contour to feed compressed gas between said surfaces as a lubricating film variable in thickness under bearing loading, said contour forming the means of distributing the compressed gas to said film and having an extent providing a volume factor not to exceed $2 \times 10^{-3}$.

4. A device as claimed in claim 3 in which said contour is proportional to $$\frac{1}{\sqrt{R}}$$

from the center of said feed passage where R represents the radius of the film to provide minimum flow resistance.

5. A device as claimed in claim 3 in which said contour is proportional to $$\frac{1}{R}$$

for a portion of the radius of said film where R represents the film radius.

6. A vibration-free gas bearing comprising a pair of relatively movable surfaces, at least one of said surfaces being grooved to form a gas distribution means, feed passage means forming a gas flow restriction communicating with a compressed gas source leading to said groove and distributed by said groove as a lubricating compressed gas film between said surfaces, the extent of concavity of said grooving affording a volume factor not in excess of $2 \times 10^{-3}$.

7. A vibration-free bearing comprising a pair of relatively movable inter-fitting bearing surfaces, a contour formed in one of said bearing surfaces, and a restricted gas feed passage leading from a compressed air source to one of said surfaces to feed compressed gas as a lubricating film between said surfaces, said contour forming the means of distributing the compressed gas to said film and having an extent providing a volume factor not to exceed $2 \times 10^{-3}$.

8. In a thrust bearing or segment of a radially loaded bearing, a pair of bearing surfaces separated by a lubricating film of compressed gas and offering therebetween a gas flow restriction dependent on film thickness, a feed passage formation leading to said film and forming a substantially fixed gas flow restriction affording appreciably less restriction than the aforesaid restriction under condition of bearing loaded, said feed pasage formation including gas distributing means to distribute gas to said film and maintain film pressure under loading of the bearing while limiting the volume of gas in communication with the film below a vibration volume and not to exceed a volume factor of $2 \times 10^{-3}$.

9. In a thrust bearing or segment of a radially loaded bearing having a pair of opposing bearing surfaces, a gas flow passage formation leading to between said surfaces to supply a compressed gas lubricating film and affording a gas flow restriction substantially constant and independent of variation of film thickness, the separation of said opposing surfaces as lubricated by said film varying under loading to provide a gas flow restriction varying from a value less than said substantially fixed restriction at light loading and substantially greater than said fixed restriction under heavy loading, said surfaces having a formation whereby said gas flow passage formation opens into said film through a gas storing distributing formation having an extent sufficient to supply said film with pressure gas under varying loading while limiting gas storage below a vibrating volume and not exceeding a volume factor of $2 \times 10^{-3}$.

10. In an air bearing having opposed bearing surfaces, a gas feed passage leading to between said surfaces to supply a pressure gas lubricating film therebetween and forming a substantially fixed gas flow restriction, said surfaces having a variable separation under loading to provide a variable gas flow restriction through said film, and a contour formation defined by said bearing surfaces to afford gas storage between said restrictions and limiting the volume of stored gas below a vibration volume and not exceeding a volume factor of $2 \times 10^{-3}$.

11. In a thrust bearing or segment of a radially loaded bearing, a pair of relatively movable surfaces, restricted gas passage means forming a substantially constant gas flow restriction opening through to between said surfaces, a pressure gas supply connected with said restricted passage means to supply a lubricating pressure gas film between said surfaces, the spacing of said surfaces forming a gas flow restriction variable with bearing loading, said surfaces being formed to provide a hollow formation in communication with said gas passage means to increase flow section distributing compressed gas to said film to maintain film pressure under loading, the extent of the combined hollow of said surfaces being such as to limit gas volume within the hollow below a vibration volume and so as not to exceed a volume factor of $2 \times 10^{-3}$.

12. In a thrust bearing or segment of a radially loaded gas bearing, a pair of relatively movable surfaces, restricted gas passage means opening through one of said surfaces and forming a substantially constant gas flow restriction, a pressure gas supply connected with said restricted passage means to supply a lubricating pressure gas film between said surfaces, the spacing of said surfaces forming a gas flow restriction variable under bearing loading, the surface through which said gas passage means opens being hollowed with the hollow in communication with the said gas passage means to increase the flow section from said gas passage means to said film, the extent of said hollow being such as to limit gas volume within the hollow below a volume that would vibrate and not to exceed a volume factor of $2 \times 10^{-3}$.

13. A vibration-free radial gas bearing comprising a pair of relatively movable surfaces, the one located within the other by pressure differences in lubricating pressure gas film segments at opposite sides of the bearing, each film segment being fed by a feed passage means forming a substantially constant gas flow restriction and including distributing means leading to the film segment and maintaining film pressure under loading while limiting gas volumes in communication with said film segment below those volumes at which vibration occurs and not to exceed a volume factor of $2 \times 10^{-3}$.

14. A vibration free spherical bearing comprising a pair of relatively movable spherical surfaces, the one located within the other by pressure differences in lubricating pressure gas film segments at opposite sides of the bearing, each film segment being fed by a feed passage means forming a substantially constant gas flow restriction and including distributing means leading to the film segment and maintaining film pressure under loading while limiting gas volumes in communication with said film segment below those volumes at which vibration occurs and not to exceed a volume factor of $2 \times 10^{-3}$.

15. A device as claimed in claim 14 in which said feed passage means is continued through said bearing.

16. In a gas bearing having a pair of relatively movable surfaces to be separated by a lubricating film of compressed gas, said surfaces being formed to provide gas feeding and distributing passage means adapted to conduct a gas from a supply pressure source to between said surfaces to maintain a lubricating gas film therebetween, said passage means including a gas flow restriction isolating said film from said source to a degree sufficient to prevent vibration and controlling film pressure under change of load at the point of load change, the separation of said surfaces forming a second gas flow restriction varying with varying loading, and said gas feeding and distributing means being constituted to provide a distributed entrance to the film to maintain under loading and at the point of application of the load a film pressure continuously high in a direction lateral to film flow and shaped to limit gas volume between said restrictions below a vibration volume and not exceeding a volume factor of $2 \times 10^{-3}$.

17. In a gas bearing having a pair of relatively movable bearing elements with bearing surfaces to be separated by a lubricating compressed gas, said bearing elements being formed to provide gas feeding and distributing passage means adapted to conduct a gas from a supply pressure source to between said surfaces to maintain a pressure film therebetween, said passage means including a gas flow restriction independent of the relative separation of said surfaces isolating said film from said source and sufficient to prevent vibration and controlling film pressure under change of load at the point of load change, the separation of said surfaces forming a second gas flow restriction varying with bearing loading, and said gas feeding and distributing means being constituted to provide a distributed entrance to the film to maintain under loading and at the point of application of the load a film pressure continuously high in a direction lateral to film flow and limit gas volume between said restrictions below a vibration volume and not exceeding a volume factor of $2 \times 10^{-3}$.

18. In a gas bearing, a pair of relatively movable bearing surfaces adapted to be supported by continuous gas lubricating film supplied from a compressed gas source, flow passage means for connecting and distributing gas from the compressed gas source to the continuous gas lubricating film, the separation of said surfaces constituting a flow restriction dependent on film thickness, said connecting and distributing means including a restriction upstream from the film limited in respect to the perimeter of said bearing surface to avoid generation of vibration energy by film pressure hysteresis and turbulence and also including an entrance to the film having a perimeter sufficient to avoid any appreciable gas flow restriction dependent on film thickness restricting gas flow down-stream of said second-mentioned restriction, and said connecting and distributing means being restricted to limit gas volume between said restrictions to avoid generation of vibration energy by film pressure hysteresis and turbulence and not to exceed a volume factor of $2 \times 10^{-3}$ inches.

19. An air bearing comprising a pair of relatively movable surfaces separated by a lubricating film of compressed gas, a source of compressed gas, and feed passage means in communication with said source and feeding said film to spread said gas pressure over a large area of said film, said surfaces being formed whereby the total extent of contour depression therein is less than that contour extent providing a sufficient gas storage for vibration and does not afford a volume factor exceeding $2 \times 10^{-3}$ inches, and said passage means being restricted to limit communication between said source and film to substantially isolate said source from effects of change of film thickness and to limit turbulence in said film.

20. A bearing as claimed in claim 19 in which said passage means forms a fixed restriction independent of film thickness.

References Cited in the file of this patent

UNITED STATES PATENTS

| Number | Name | Date |
| --- | --- | --- |
| Re. 20,305 | Klahn | Mar. 23, 1937 |
| 466,645 | Wood | Jan. 5, 1892 |
| 1,337,742 | Abbott | Apr. 20, 1920 |
| 1,906,715 | Penick | May 2, 1933 |
| 2,049,343 | Warren | July 28, 1936 |
| 2,086,896 | Carter | July 13, 1937 |
| 2,442,202 | Hughes-Caley | May 25, 1948 |

FOREIGN PATENTS

| Number | Country | Date |
| --- | --- | --- |
| 548,363 | Great Britain | Oct. 7, 1942 |
| 626,268 | Great Britain | July 12, 1949 |
| 896,233 | France | Apr. 24, 1944 |